US006668282B1

(12) United States Patent
Booth, III et al.

(10) Patent No.: US 6,668,282 B1
(45) Date of Patent: Dec. 23, 2003

(54) SYSTEM AND METHOD TO MONITOR AND DETERMINE IF AN ACTIVE IPSEC TUNNEL HAS BECOME DISABLED

(75) Inventors: Earl Hardin Booth, III, Durham, NC (US); Charles Steven Lingafelt, Durham, NC (US); Phuong Thanh Nguyen, Cary, NC (US); Leo Temoshenko, Raleigh, NC (US); Xiaogang Wang, Dublin, OH (US)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 09/630,936

(22) Filed: Aug. 2, 2000

(51) Int. Cl.[7] .................... G06F 15/173; G06F 15/16
(52) U.S. Cl. .................... 709/224; 709/223; 709/227
(58) Field of Search ................ 709/223, 224, 709/227, 231

(56) References Cited

U.S. PATENT DOCUMENTS

| | | | | |
|---|---|---|---|---|
| 5,325,362 | A | 6/1994 | Aziz | 370/94.3 |
| 5,550,984 | A | 8/1996 | Gelb | 395/200.17 |
| 5,745,884 | A | 4/1998 | Carnegie et al. | 705/34 |
| 5,805,803 | A | 9/1998 | Birrell et al. | 395/187.01 |
| 5,825,891 | A | 10/1998 | Levesque et al. | 380/49 |
| 5,835,726 | A | 11/1998 | Shwed et al. | 395/200.59 |
| 5,850,446 | A | 12/1998 | Berger et al. | 380/24 |
| 5,852,721 | A | 12/1998 | Dillon et al. | 395/200.47 |
| 5,864,666 | A | 1/1999 | Shrader | 395/187.01 |
| 6,092,113 | A * | 7/2000 | Maeshima et al. | 709/230 |
| 6,317,786 | B1 * | 11/2001 | Yamane et al. | 709/224 |
| 6,473,798 | B1 * | 10/2002 | Grosser et al. | 709/224 |

FOREIGN PATENT DOCUMENTS

| | | | | |
|---|---|---|---|---|
| GB | 2317308 | 8/1997 | | H04L/12/00 |
| GB | 2323757 | 2/1998 | | H04L/29/06 |
| JP | J10070566 | 3/1998 | | H04L/12/46 |
| JP | J10070576 | 3/1998 | | H04L/12/66 |
| WO | WO9726734 | 1/1997 | | H04L/9/00 |
| WO | WO9843446 | 3/1997 | | H04Q/7/00 |

OTHER PUBLICATIONS

Bruyeron et al. "Experimentations with TCP Selective Acknowledgement" ACM SIGCOMM, pp. 54–77, vol. 28, iss. 2: Apr., 1998.*

"Design for a Simple Network Management Protocol Subagent for Internet Firewalls", IBM Technical Disclosure Bulletin, vol. 40, No. 03, Mar. 1997, pp. 63–68.

"Fusion Power? [virtual private networks]", Information Week, No. 50, Jan. 1999, pp. 29–31.

"Making the Move to VPN Tunneling", Telecommunications (International Edition), vol. 32, No. 10, Oct. 1998, pp. 87–88.

"The ABCs of Remote Access VPNs", Business Communications Review, vol. 28, No. 10, Oct. 1998, pp. 47–50.

"Secure Web Tunneling", Computer Networks and ISDNtems, vol. 30, No. 1–7, Apr. 1998 pp. 531–539.

(List continued on next page.)

*Primary Examiner*—David Wiley
*Assistant Examiner*—Joseph E Avellino
(74) *Attorney, Agent, or Firm*—Gerald R. Woods

(57) ABSTRACT

A method and system for monitoring the status of an active secure tunnel between a pair of network elements in a communications network. The first network element originates and transmits an Internet Protocol Security (IPSec) test message to a second network element using a first unidirectional secure tunnel in response to the receipt of an active tunnel monitor command. The second network element receives the IPSec test message and transmits a response back to the first network element using a second unidirectional secure tunnel. The number of times that second network element failed to return a response to an IPSec test message is accumulated during a predetermined time interval and then compared with a threshold value to determine if the active secure tunnel has become disabled.

33 Claims, 10 Drawing Sheets

OTHER PUBLICATIONS

"A Public–Key Based Secure Mobile IP", Proceedings of the Third Annual ACM/IEEE International Conference on Mobile Computing and Networking, 1997, pp. 173–184.

"Extend your Net with VPNs", BYTE (International Edition), vol. 22, No. 11, Nov. 1997, pp. 114–119.

"Mobile IP", International Journal of Communication Systems, vol. 11, No. 1, Jan.–Feb. 1998 pp. 3–20.

"A New Scheme of Connectionless Transmission over ATM with Scalability and Cut–Through Techniques", ISS'97: World Telecommunications Congress. 'Global Network Evolution: Convergence or Collision?' Proceedings, Pt. vol. 1, pp. 199–206.

"Low–loss TCP/IP Header Compression for Wireless Networks", Dept. of Comput. Sci., Lulea Univ. of Technol., Sweden, Wireless Networks, vol. 3, No. 5, 1997, pp. 375–387.

"HIPPI over ATM Networks: Extending Connections for Distributed Computing", IEEE Concurrency, vol. 5, No. 4, Oct.–Dec. 1997, pp. 40–53.

"Dial–in Virtual Private Networks Using Layer 3 Tunneling", Proceedings, $22^{nd}$ Annual Conference on Local Computer Networks, LCN'97, Nov. 2–5, 1997, pp. 555–561.

"A Virtual Private Affair", BYTE, vol. 22, No. 7, Nov. 1997, pp. 79–80.

"Securing the Internet Protocol", Proceedings of the Fourteenth Annual ACM Symposium on Principles of Distributed Computing, 1995, pp. 257.

"Hybrid Internet Access", AIP Conference Proceedings, 1995, No. 325, pp. 69–74.

"Performance Evaluation of Multicast Rerouting Scheme for Handover in Mobile IP", Journal of KISS (Computer Systems and Theory), vol. 25, No. 8, Aug. 1998, pp. 867–876.

* cited by examiner

| DEVICE ADDRESS | | SPI | ENCRYPTION KEY |
| --- | --- | --- | --- |
| SOURCE | DESTINATION | | |
| A | B | SPI-1 | KEY_1 = "ABC..." |
| B | A | SPI-2 | KEY_2 = "FG123..." |
| | | | |
| | | | |
| | | | |

FIG. 10

SYSTEM AND METHOD TO MONITOR AND DETERMINE IF AN ACTIVE IPSEC TUNNEL HAS BECOME DISABLED

CROSS-REFERENCE TO RELATED APPLICATIONS

This patent application is related to, and contains common disclosure with, co-pending and commonly assigned patent applications "Apparatus, Method and System for Secure Tunnel Ping and Message Format for Use Therein", serial number 09/438,119, filed Nov. 10, 1999; "System and Method to Determine Connectivity of a VPN Secure Tunnel", serial number 09/630,794; "System and Method to Verify Availability of a Back-up Secure Tunnel"; serial number 09/630,779; and "System and Method for Conversion of an ICMP Ping to an IPSec Ping via a Proxy-Ping Function", serial number 09/630,749. The co-pending patent applications are hereby incorporated by reference into this description as fully as if here represented in full.

BACKGROUND OF THE INVENTION

The present invention relates to improvements in the systems and methods for communicating in an environment including at least one secure tunnel (such as is sometimes referred to as Internet Protocol Security or "IPSec" herein and in the industry and its standards activity).

Communications systems involve a variety of devices which are connected to a data transmission network, often through a variety of conventional devices such as routers, switches and other components. As the networks have become larger, incorporating local area networks (LANs) and wide-area networks (WANs), these networks have become more complex and involve an increasing number of components. One of the largest networks is referred to as the Internet, a constantly-changing communications network including a large number of interconnected network devices or workstations.

In addition, many companies are now applying Internet technologies to build private Intranets, enabling users in an organization to go beyond electronic mail and access critical data through web browsers. While Internet traffic is currently composed primarily of text, graphics, and images, this traffic is expected to expand in the near term to include more bandwidth intensive audio, video, voice, and multi-media applications.

As applications proliferate and demand ever greater shares of bandwidth at the desktop and as a total number of users continues to grow, the pressure for increased bandwidth will continue to grow at the desktop, the server, the hub, and the switch. Organizations will need to migrate critical portions o their networks to higher bandwidth technologies, such as Gigabit Ethernet, Fast Ethernet, Gigabit Token-Ring, and High Speed Token-Ring.

Successful communications requires that each message be properly addressed within the communications system and that each link in the communications system be connected to the system and perform properly. If any of the links fail, communications through the failed link will not be successful. When communications through the system have failed, it is necessary to isolate the problem so it can be resolved, a process which involves testing the components, either individually or in groups.

One method of testing a communications system to determine if it is properly connected and performing is called a "ping". A ping is a message sent from a first network device and addressed to a second network device with the request that a responsive message be returned from the second network device to the first device, indicating that both network devices and the intervening network devices are properly connected to the network and that each is working appropriately.

A ping is also used in testing large and complex networks. It is particularly useful for testing the network in portions. Thus, when the entire network is not properly working pings may be used to isolate the problem. In essence, a portion of the network can be tested and determined to be operating properly, indicating that any problem in the larger network must be located elsewhere.

Communications on the Internet presents additional problems because of the size of the network and because communications are not handled in a uniform manner—a first packet between two devices may be sent over one route and a completely different path may be used for a second packet, even when both packets are part of the same message. Furthermore, the Internet is inherently unsecure. As security techniques are defined to add security to the Internet, these techniques often conflict with the techniques (such as the "ping" testing methods) which have been in common use.

As organizations such as the Internet Engineering Task Force (IETF) define techniques for reducing the security exposures of Internet communications, security concepts such as IP security (IPSec) have been proposed. IPSec is a developing standard for security at the network or packet processing layer of network communications. Earlier security approaches inserted security at the application layer of the communications model. IPSec is especially useful for implementing virtual private networks (VPNs) and for remote user access through dial-up connection to private networks. A big advantage of IPSec is that security arrangements can be handled without requiring changes to individual user computers. IPSec provides two choices of security service: Authentication Header (AH), which allows authentication of a sender of data and Encapsulating Security Payload (ESP) which supports both authentication of the sender and encryption of the data as well. The specific information associated with each of these services is inserted into the packet in a header that follows the IP packet header. Separate key protocols can be selected, such as the ISAKMP/Oakley protocol.

One feature of IPSec includes secure tunnels, in which a single logical tunnel is limited to communication of messages from a single source address to a single destination address and which may require other specific security features defined for communication between network devices. A secure tunnel in such communications systems inherently provides a limited, one-way communications path because its definition allows only messages from a single source to a single destination, so that a return message from the original destination back to the original source cannot use the same secure tunnel as the message going the other way, but such return message must use a different path such as a different secure tunnel with its own security requirements.

Tunneling or encapsulation is a common technique in packet-switched networks. It consists of wrapping a packet in a new one. That is, a new header is attached to the original packet. The entire original packet becomes the payload of the new one. In general, tunneling is used to carry traffic of one protocol over a network that does not support that protocol directly. For example, NetBIOS or IPX can be encapsulated in IP to carry it over a TCP/IP wide area network (WAN) link. In the case of IPSec, IP is tunneled through IP for a slightly different purpose, i.e., to provide total protection, including the header of the encapsulated packet. If the encapsulated packet is encrypted, an intruder cannot figure out the destination address of that packet. Without tunneling the intruder could. The internal structure of a private network can be concealed in this manner.

A notable advantage of IP tunneling is the possibility to exchange packets with private IP addresses between two intranets over the public Internet, which requires globally unique addresses. Since the encapsulated header is not processed by the Internet routers, only the end points of the tunnel (the gateways) need to have globally assigned addresses; the hosts and the intranets behind them can be assigned private addresses. As globally unique IP addresses are becoming a scarce resource, this interconnection method gains importance.

IPSec can be configured to create tunnels in two modes:
1. Tunnel mode—in which the protocol data unit (PDU) is encapsulated within another IP frame and an outermost IP address is added. This address is the address of the tunnel termination device.
2. Transport mode—in which the PDU is not encapsulated and the existing (outermost) IP address is used. This address is the address of the tunnel termination device.

The present invention applies to tunnel mode. Note that in IPSec terminology, the word tunnel is used to describe both a mode of operation, i.e., tunnel mode (a new header is created to encapsulate the original IP frame), or transport mode (no new header is created).

It is necessary to have certain information in order to use a secure tunnel: for example, the configuration/policy for IPSec devices may require a "legal address", a security protocol indicator (also known as an SPI value) and a valid key before an originating device can send frames through a secure tunnel to a destination device.

Prior art secure communications systems have disadvantages and limitations and constructing a message for providing a ping in a system of secure tunnels is far from a simple process and may depend on information which is hard to acquire and difficult to use. Furthermore, the entire concept of a "ping" message in a secure tunnel environment such as the IPSec proposed by a standards organization may be difficult to implement, in view of the construction and operation of the secure tunnels which have the effect of limiting communication and requiring strict adherence to certain communications protocols.

The above-referenced co-pending, commonly assigned patent application "Apparatus, Method and System for Secure Tunnel Ping and Message Format for Use Therein" provides a "ping" method for testing a secure communication system. During the life of an IPSec tunnel, a variety of problems may occur to disrupt the connectivity of the tunnel. Within the IPSec standard, there is no "keep alive" or "heart beat" protocol to detect that a tunnel is no longer functioning, thus there is no method at the network layer that can detect this.

SUMMARY OF THE INVENTION

The present invention overcomes the disadvantages and limitations of the prior art communications systems, particularly in the secure tunnel environment. More particularly, the present invention provides a method and system for monitoring and determining if a logical tunnel between network elements in a secure communication system is still active and, if not, sending a notification to a network administrator. Such an invention has particular applicability in a secure tunnel system of the type described in proposed standards such as the IPSec protocol.

The present invention has the advantageous effect that it facilitates testing of the secure tunnel capability of a network, in addition to testing the physical connections of the network.

The present invention has the advantageous feature that it may be used without regard to the configuration of the destination device. In fact, the destination device may not even realize that a "ping" message has passed through it and returned to the device originating the message.

The present invention has the benefit that knowledge of the outgoing message handling procedures or protocols of the destination device is not required on the part of the originating machine. This is because the destination device passes the "ping" message back to the originating device through the destination device's normal handling of outgoing mail, such as an IP protocol stack.

The present invention has the advantage that the return message from a destination device passes through the secure tunnels, for example, of the type referred to as the IPSec tunnels proposed by the IETF.

Other objects and advantages of the present invention will be apparent to those skilled in the relevant arts in view of the following detailed description of the preferred embodiment, taken in conjunction with the appended claims and the accompanying drawings.

BRIEF DESCRIPTION OF THE DRAWINGS

The invention is better understood by reading the following detailed description of the invention in conjunction with the accompanying drawings, wherein:

FIG. 10 illustrates a logical view of selected fields from the Tunnel Definition data base.

DETAILED DESCRIPTION OF THE INVENTION

Figure 1:
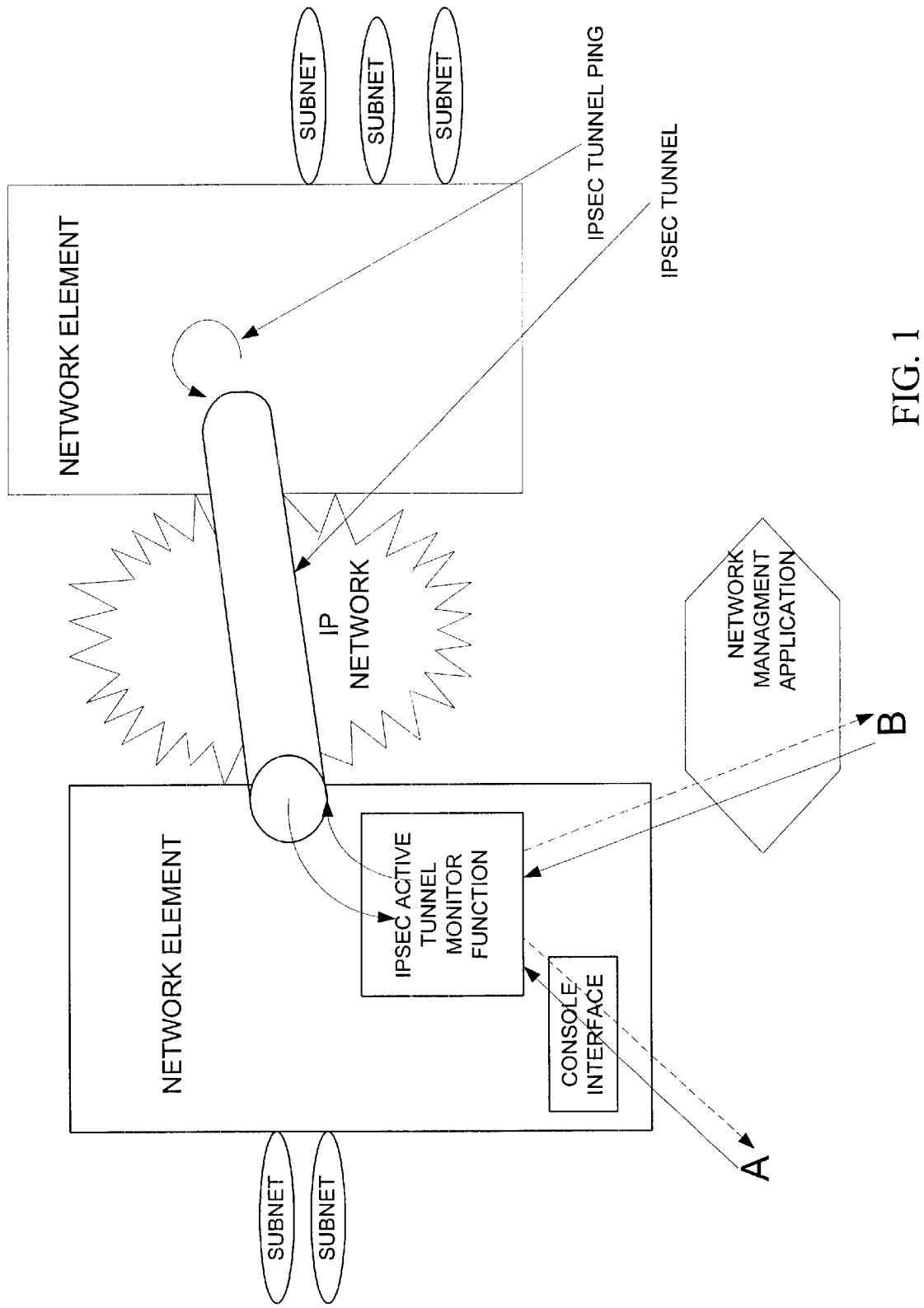
FIG. 1 illustrates an embodiment of a system configuration of the invention including an Active Tunnel Monitor function.

The following detailed description of the present invention is provided as a detailed, enabling teaching of the present invention in its best currently-known embodiment. Those skilled in the relevant arts will recognize that many changes can be made to the embodiment described while still obtaining the beneficial results of the present invention. It will also be apparent that some of the desired benefits of the present invention can be obtained by selecting some of the features of the present invention without using other features. Accordingly, those who work in the art will realize that many modifications and adaptations to the present invention are possible and may even be desirable in certain circumstances and are a part of the present invention. Thus, the following description is provided as illustrative of the principles of the present invention and not in limitation thereof, since the scope of the present patent is defined by the claims.

IPSec (IP Security) is an extension to the Internet Protocol (IP) protocol stack which provides secure tunnels between the IP stacks in two network elements. The Internet Engineering Task Force (IETF) has a number of draft standards supporting IPSec; the overview architecture is found in Request for Comments (RFC) 2401, "Security Architecture for the Internet Protocol."

This invention defines a method to monitor and determine if an existing IPSec Tunnel between the network elements has stopped working and then to notify the network administrator. Since the tunnel is logical, rather than physical, a method using IPSec itself must be used (i.e. the physical interface may be up and passing traffic, but the logical tunnel formed by IPSec can be down).

IPSec in tunnel mode, encapsulates an IP header, the inter PDU, within a new IP header and sends the frame to the peer IP stack for decapsulation. Filter or access controls define what frames (by protocol type, IP address, etc.) are allowed to flow through the tunnel. These filters/access controls (called configurations or policies) are set as restrictive as possible in an attempt to prevent unauthorized traffic from flowing through the tunnels. Currently, unless the IPSec filter/access controls at originating endpoints has been explicitly configured to allow a "standard" ping into the tunnel and the other endpoint has been explicitly configured to allow the ping out of and then back into the tunnel and the originating endpoint explicitly configured to allow the ping out of the tunnel, then the ping message will be dropped by the IPSec system. To prevent unauthorized use of the tunnel, it is not desirable to allow the ping to flow through the tunnels. Thus, a new method to accomplish the same purpose as a ping was needed. Such method is described in co-pending patent application "Apparatus, Method and System for Secure Tunnel Ping and Message Format for Use Therein". The present invention utilizes the IPSec Tunnel Ping although this is not essential to the present invention if an alternative methodology to test the IPSec tunnel is available.

This invention describes a system and method to monitor and detect that an IPSec tunnel's connectivity has been lost and then to notify the network administrator for corrective action. In one preferred embodiment, the active tunnel monitor (heartbeat) method is initiated from either a command given at a console interface on the network element that forms the tunnel (A in FIG. 1), or a network management application command to the network element that forms the tunnel (B in FIG. 1).

Note that in FIG. 1, for illustrative purposes, the IPSec tunnel between the network elements is shown as one tunnel, in practice an IPSec "tunnel" between two network elements is composed of two unidirectional tunnels. The solid lines originating at A and B indicate the flow which instantiates the function and the corresponding dashed lines indicate the results.

Upon receipt of the initiate IPSec Active Tunnel Monitor command, the network element, using the IPSec Tunnel Ping (ITP) tests and periodically verifies the connectivity of the active IPSec tunnel with the following algorithm (or a variant thereof). For purposes of illustration, the implementation abstract of the IPSec Active Tunnel Monitor function command (IATM) is given below:

IATM id time_to_run time_between number_of_failures bytes, where each parameter of the command represents the following:
| IATM | the command, e.g. IPSec Active Tunnel Monitor; |
| id | the identification of the tunnel; |
| time_to_run | time that the monitor function will be active; |
| time_between | the time to wait between each tunnel connectivity verification attempt; |
| number_of_failures | the number of consecutive failures of connectivity attempts required to determine that the tunnel is no longer active; and |
| bytes | the payload size of the connectivity test packet. |

A similar command is required to stop the function before the time has expired, i.e., IATM STOP.

The above parameters, although not necessarily needed to conduct an IPSec Active Tunnel Monitor test, are provided for flexibility and future extensions (e.g., one type of connectivity failure could be that a tunnel does not pass frames larger than n bytes, this same method, by specifying a sufficiently large byte parameter could be useful).

Figure 2:
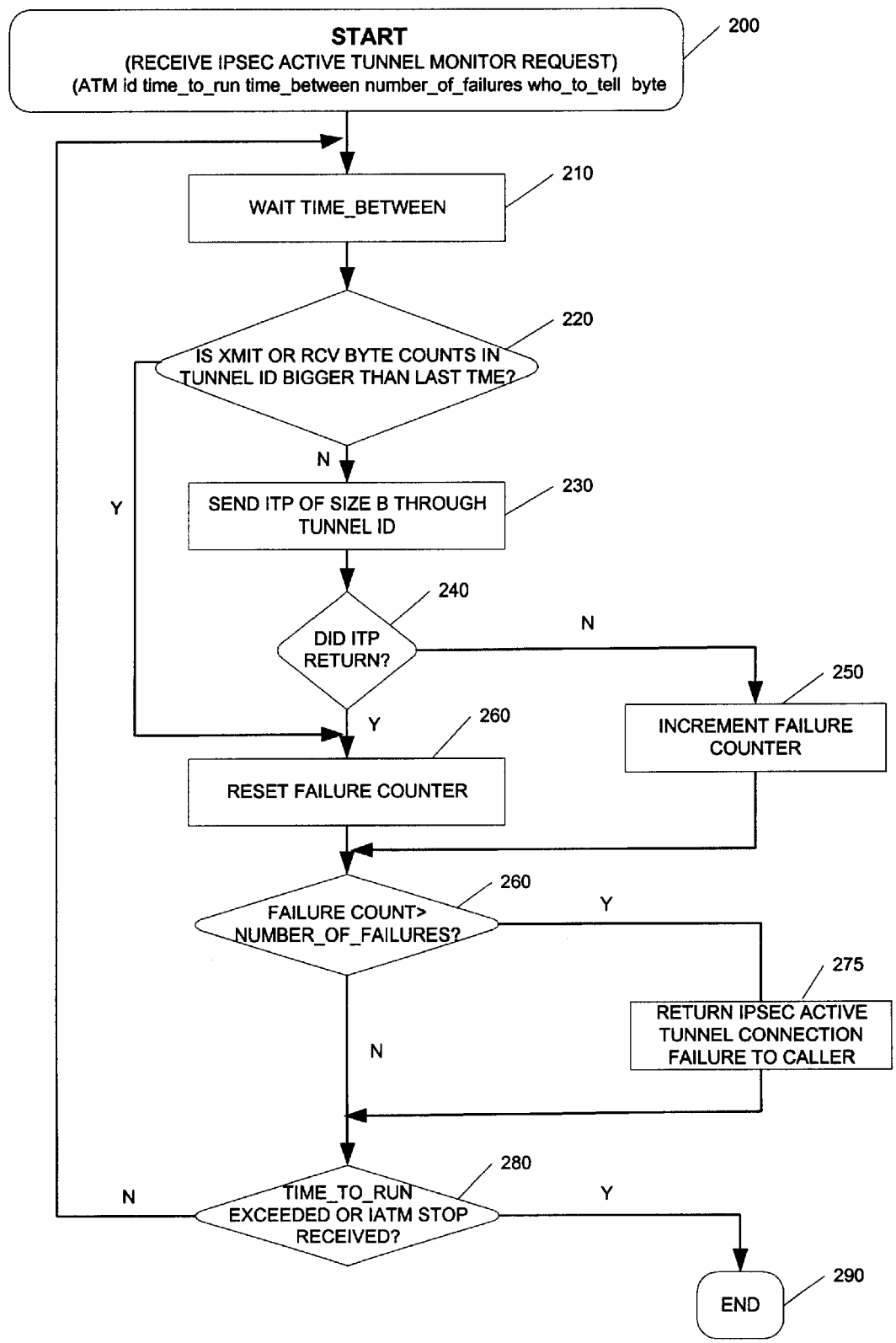
FIG. 2 illustrates the processing logic of the Active Tunnel Monitor function of the present invention.

The processing logic in FIG. 2 illustrates the IPSec Active Tunnel Monitor function. Note that a system performance improvement (i.e., less use of processor and link resources) is obtained by observing that if the number of bytes received or transmitted in the observed tunnel has increased since the last connection verification attempt, then the tunnel must be active. Since the tunnel is active, the need to send an ITP is negated, thus saving system resources.

The results are returned per the method of invocation, i.e., if initiated from a network management application via Simple Network Management Protocol (SNMP), the results are returned via SNMP to the network management application. If invoked from a console interface, the results are returned to the console interface. The results may also be written to a log file. Based on the results, the network administrator or network management application may change routing tables, update the policy database or cause a trap to a system management system, etc. The result is an indication that the monitored tunnel is no longer active. This system and method provides a network administrator with the ability to monitor the connectivity of an IPSec tunnel in pre-production or in the production network.

The processing logic illustrated in FIG. 2 starts in termination block 200 with the receipt of an IPSec active tunnel monitor request. In logic block 210, the process waits until the time-between connectivity verification attempts has elapsed. Next, in decision block 220, a test is made to determine if the transmit or receive byte counts in the tunnel ID are bigger than on the previous connectivity verification attempt. If it is, then processing continues at logic block 260 with the resetting of the failure counter. If the number of bytes received or transmitted in the observed tunnel has not increased since the last connection verification attempt, then an ITP of size B is sent to the tunnel ID as indicated in logic block 230. In decision block 240, a test is made to determine if the ITP has returned. If it has not, then the failure counter is incremented in logic block 250. If the ITP did return, then in logic block 260 the failure counter is reset. Next, a determination is made in decision block 270 if the failure count exceeds the number_of_failures parameter. If it has, then in logic block 275, an IPSec active tunnel connection failure is returned to the caller. If the failure count is less than or equal to the number_of_failures parameter, then a test is made in decision block 280 to determine if the time_to_run parameter has been exceeded or if an IATM stop command has been received. If either event has occurred, then processing ends as indicated in termination block 290. Otherwise processing returns to logic block 210.

Figure 3:
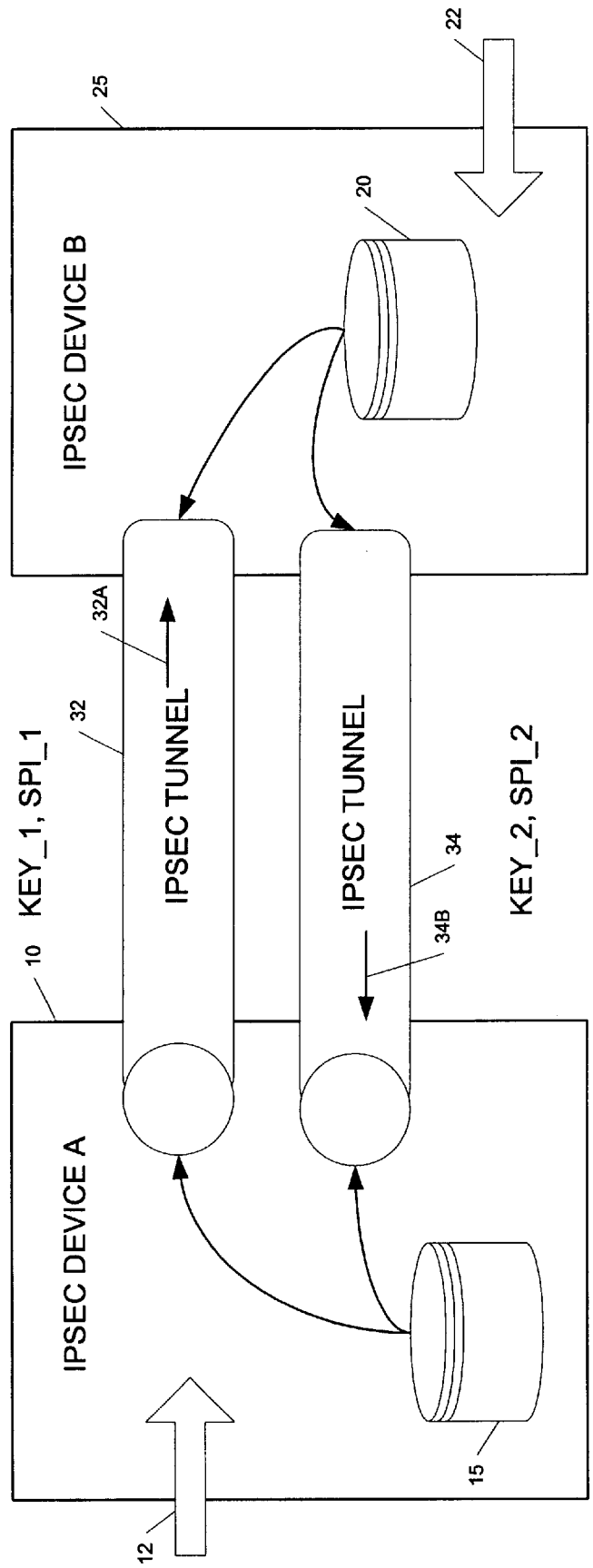
FIG. 3 illustrates a simplified systems configuration for a secure communications environment of the present invention having two one-way tunnels between two network devices.

FIG. 3 illustrates communication between a first network device 10 (device A) and a second network device 20 (device B) with a first secure tunnel 32 connecting the first network device 10 to the second network device 20 and a second secure tunnel 34 connecting the first network device 10 to the second network device 20. The first network device 10 and the second network device 20 may be secure devices of the type sometimes referred to as IPSec devices and a packet of information can flow through the secure tunnels connecting them in accordance with the protocols established for the secure tunnels. Typically, a given tunnel, such as tunnel 32 will define a unidirectional path in the direction of the arrow 32A, that is, allowing packets to pass from the first device 10 to the second device 20 (but not in the other direction, from the second device 20 to the first device 10), by requiring that the source of the packet to be the address of the first device 10 and requiring the destination to be the address of the second device 20 in order to use the tunnel 32. A tunnel has a Security Association which defines a data structure that describes which transformations are to be applied to datagrams that use the tunnel and how the transformations are to be applied. An SA is a unidirectional logical connection between two IPSec systems. An arbitrary 32-bit number called the Security Parameter Index (SPI), the destination address and the IPSec Protocol Identifier are used to uniquely identify each SA. The SPI is assigned to an SA when the SA is negotiated, and is used to identify different SAs with the same destination address and security protocol.

Each packet or datagram must have the appropriate Security Parameter Index or SPI (shown here as SPI_1) and key(s) (shown here as Key_1) in order to use the first tunnel 32. The path for a packet from the second device 20 to the first device 10 is shown as a second tunnel 34, operating in the direction of the arrow 34B and using SPI_2 and Key_2.

The first and second tunnels 32, 34 may be either physical or logical tunnels, and a plurality of tunnels may be associated with each IPSec device. Multiple tunnels may be defined between the same tunnel termination points, but each tunnel has a unique SPI and a unique key for encryption, decryption and authentication. Multiple keys may be associated with a secure tunnel. A tunnel provides for a one-way communication path between a sender and receiver.

An IPSec tunnel termination device such as the first network device 10 must have the correct addresses for the source and the destination, the correct SPI value and the correct key(s) for encryption and decryption to properly create a packet or datagram or message for sending and for deciphering (for receiving) a packet. The present invention recognizes that the information for the tunnel is unique for each direction of the tunnel, as shown in FIG. 3, and as indicated in FIG. 10 depicting a logical portion of the tunnel definition database. The present invention also recognizes that a tunnel definition database (15, 25) which is stored in each IPSec device contains the necessary information, at the conclusion of the Internet Key Exchange (IKE) process, to enable a secure ping message to be sent from a first IPSec device to a second IPSec device on a first IPSec tunnel and returned from the second IPSec device to the first IPSec device on a second IPSec tunnel. The IKE process is used to establish the tunnels and tunnel definition database, as established in the documents setting up such communication protocols, such as those established by the IETF. Request for Comments (RFC) 2401, "Security Architecture for the Internet Protocol" and Request for Comments (RFC) 2409, "The Internet Key Exchange (IKE)," both published in November 1998, are hereby incorporated by reference. FIG. 10 depicts a logical view of selected fields for the tunnel definition database. As those of ordinary skill in the art will recognize, the tunnel definition data bases (15, 25) contain many other fields in addition to those shown in FIG. 10, which may be used with the present invention.

Still referring to FIG. 3, once the IKE process has occurred and the communication information has been obtained, communications using the tunnels can be established. In order to conduct a communication over the secure tunnels 32, 34 between the first network device 10 and the second network device 20, the first network device 10 possesses the address of the destination (second) network device 20, the address of the first network device 10, the SPI_1 and the Key_1 necessary for use of the first tunnel 32 and the information (destination address, source address, SPI_2 and Key_2) necessary for use of the second tunnel 34 for a packet returning from the second device 20 to the first device 10. The communication information is stored in a database associated with each IPSec device, that is, a database 15 associated with the first device 10 (device A) and a database 25 associated with the second device 20 (device B).

Figure 4:
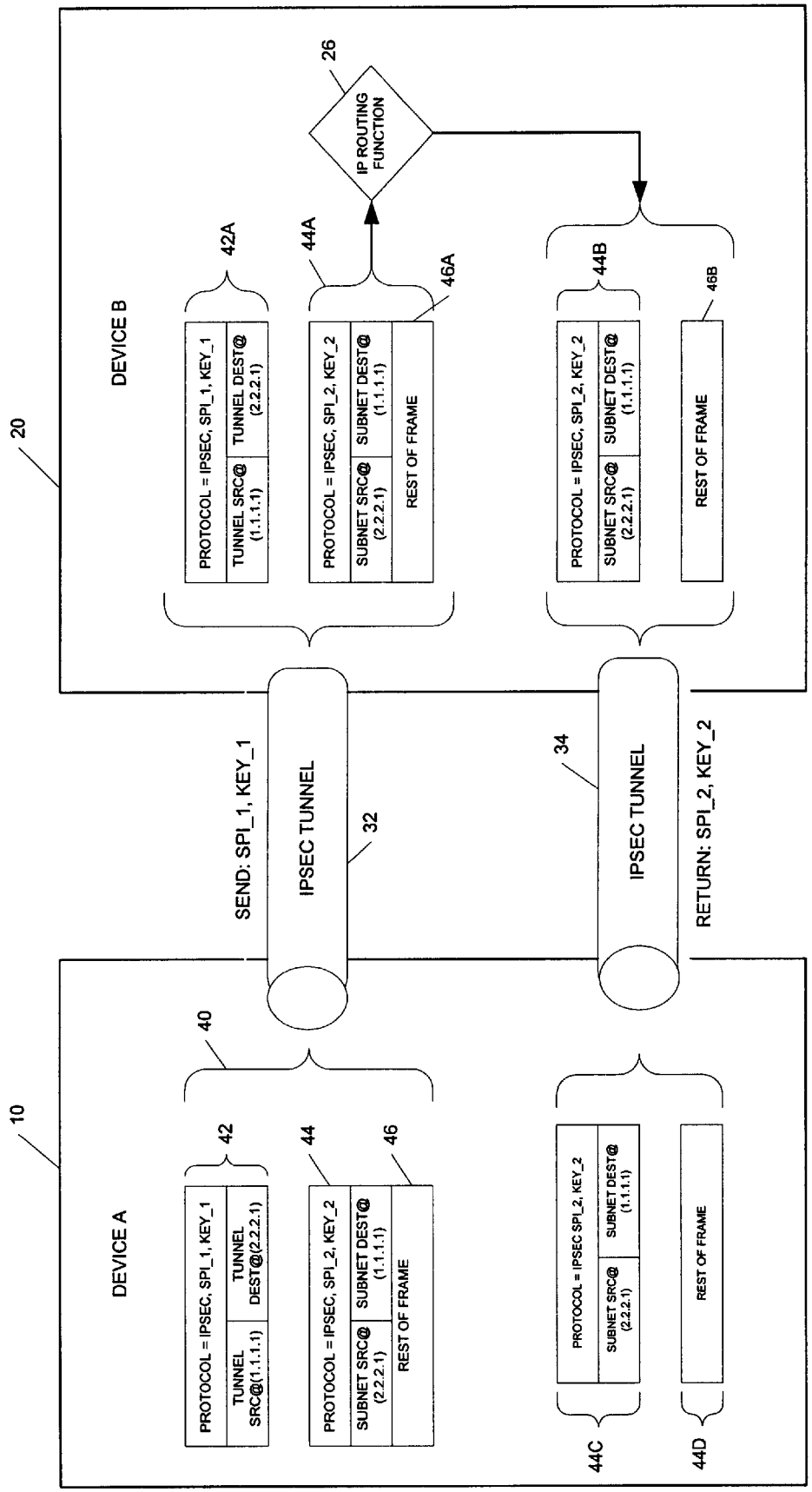
FIG. 4 illustrates a logical representation of the system of FIG. 3, with added detail on the content of messages sent between the two devices shown.

FIG. 4 illustrates the principle of the present invention directed to how to get a "ping" packet to "turn around" at the destination device 20, once it has been sent from the first device 10 using the first tunnel 32. A packet 40 is sent from the first device 10 to the second device 20 through the first IPSec tunnel 32. The packet 40 includes an outer header 42, an inner header 44 and the rest of the frame or message 46. The outer header 42 includes protocol information including the SPI_1 and the Key_1 as well as the IP address of the tunnel source device 10 (shown here for exemplary purposes as 1.1.1.1) and the IP address of the tunnel destination device 20 (shown here for exemplary purposes as 2.2.2.1). The inner header 44 includes protocol information for the return message, that is, the header for use when the original destination system sends the "ping" message back to the original source system. The inner header 44 includes the protocol information for the return message (from the second device 20 as source to the first device 10 as destination, using the IP address of the second terminal, 2.2.2.1, as the source address and the IP address of the first device 10, 1.1.1.1 as the destination address) along with the SPI_2 and the Key_2 for the second tunnel. Notice that the source and the destination addresses are inverted or reversed between the outer header 42 and the inner header 44 so that the packet will turn around at the second device 20 for the return trip to the first device 10 via second secure tunnel 34. The rest of the frame or message 46 is included in the packet 40.

When the packet 40 is received at the second device 20, the outer header 42a is discarded and the remainder of the packet 40 (the inner header 44a and the rest of the frame 46a) is treated as usual at the second device 20 by putting it on an IP protocol stack, which is then handled by an IP routing function 26. The IP routing function 26 sees the remainder of the packet 40 (the inner header 44a and the rest of the frame 46a) as an outgoing message, addressed to the first device 10 from the second device through the second secure tunnel 34 back to the first device 10.

Figure 5:
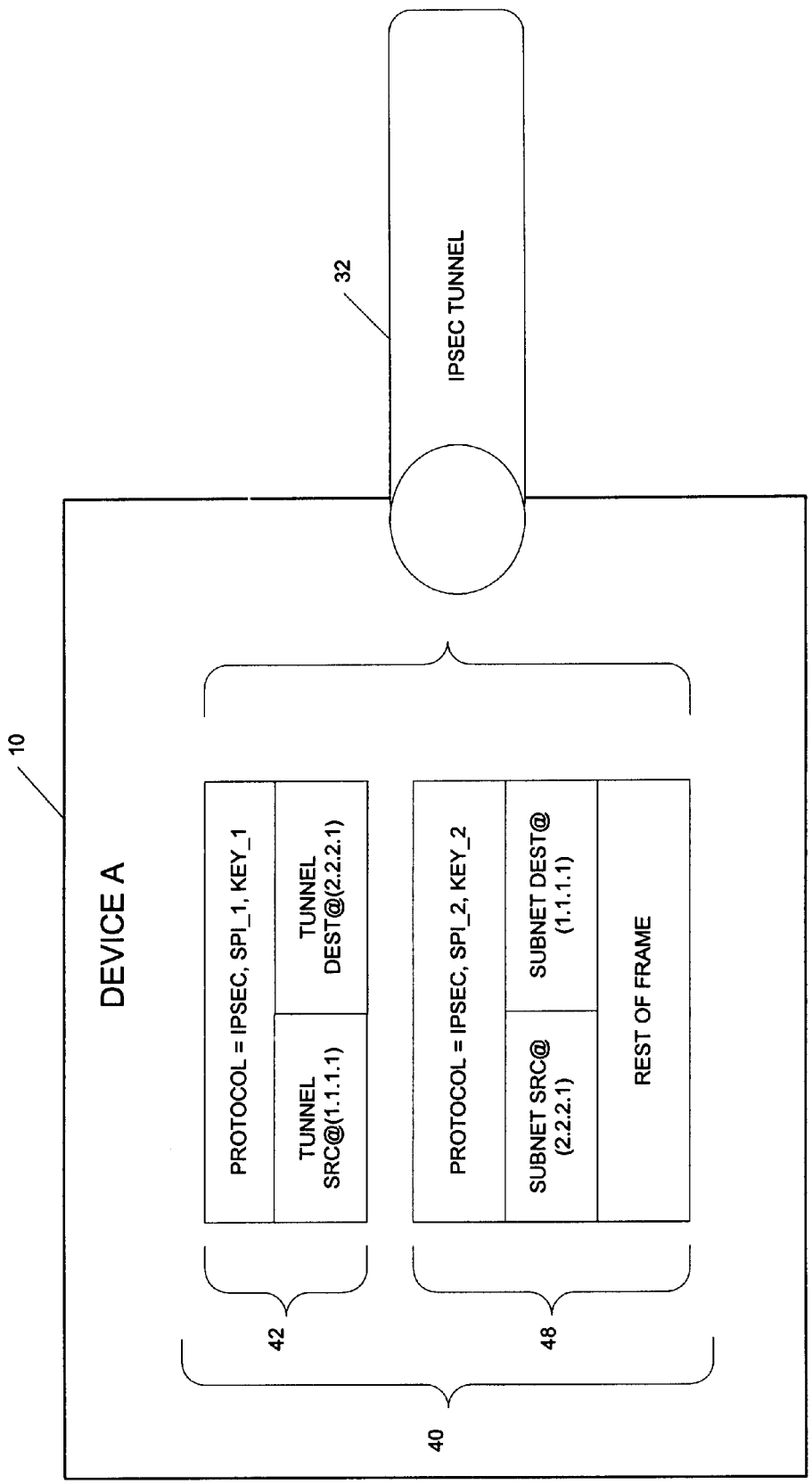
FIG. 5 illustrates a logical representation of a portion of the system of FIG. 4 showing an originating network device and the message content sent by the network device in practicing the present invention.

FIG. 5 illustrates the packet 40 being sent from the first device 10 to the second device 20 (as shown in FIG. 4) through the first IPSec tunnel 32. As shown in FIG. 5, the packet or message 40 includes the outer header 42 and the inner header 44 and the rest of the frame 46, with the inner header 44 and the rest of the frame 46 making up a return message portion 48. The return message portion 48 is pre-encapsulated with the SPI_2 and the Key_2 (not SPI_1 and Key_1), with the SPI_2 and Key_2 being the specific instances of the Security Parameter Index and encryption key that the second terminal 20 would use for return communications (rather than the SPI_1 and encryption Key_1) which the first device uses in its normal outgoing communications. When the second device 20 receives the packet 40, it decapsulates the packet 40 and removes the outer header 42, much like when a person removes the envelope in which postal service mail is mailed. The second device 20 will not decapsulate the inner header 44 since the inner header address is not destined to the second device 20. The decapsulated packet will then be delivered to the IP protocol stack and the IP routing function 26 which will send the return message portion 48 of the message back to the first device 10 and accomplish the round trip of the IPSec Tunnel Ping (ITP).

Figure 6:
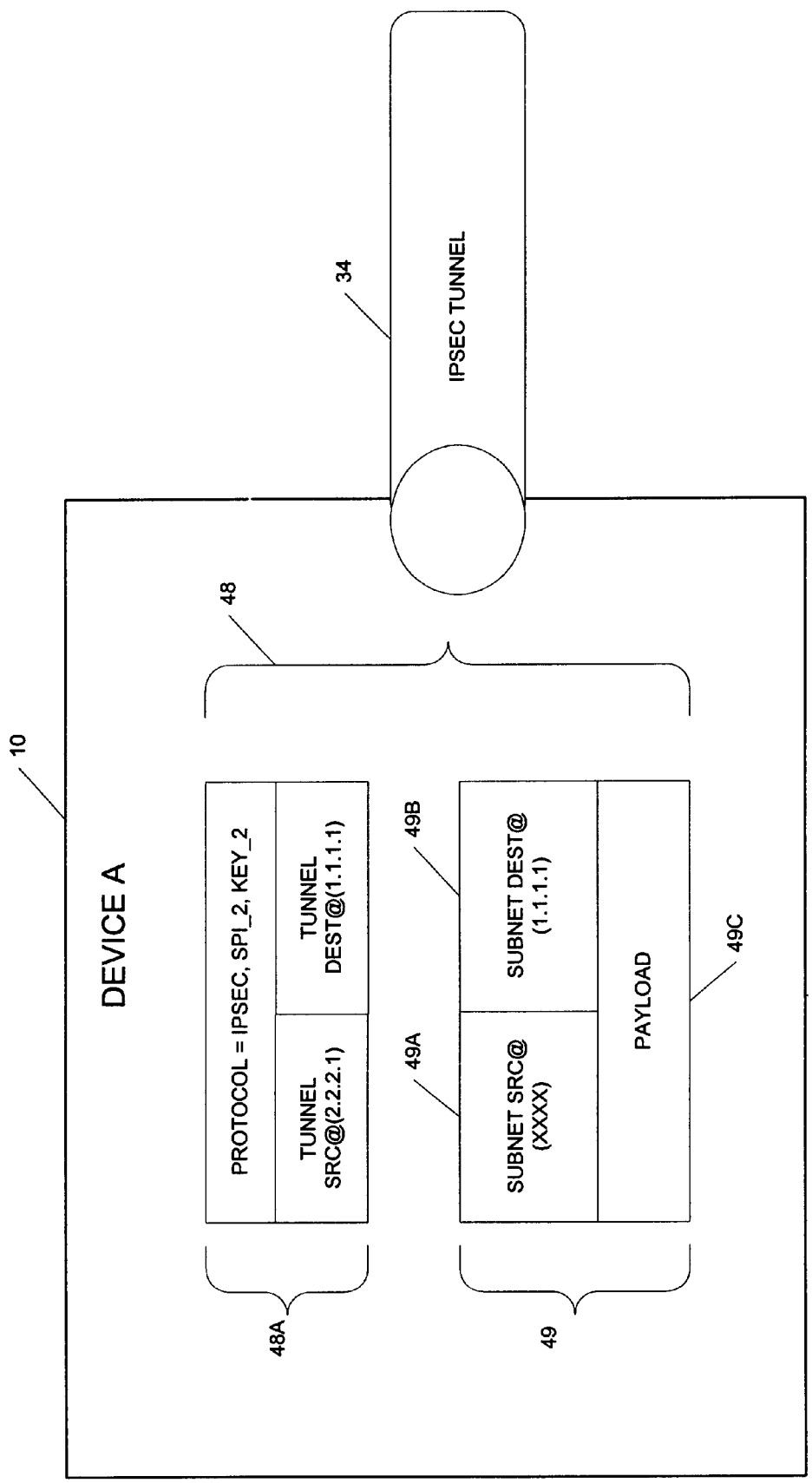
FIG. 6 illustrates a logical representation of a portion of the system of FIG. 4, showing the originating network device with the returned message from a destination network device.

FIG. 6 illustrates the return message 48, as received by the first device 10 from the second terminal 20 through the second secure device 34. When the return message 48 is received by the first device 10, it is desirable that the message be recognized as a returned "ping" message and discarded. This recognition depends on two attributes of the IPSec message: that it contains a nested IP header within the IPSec packet and that it includes one or more values in the nested IP header that can be made unique. The constructed return message 48 includes a header 48A (the inner header 44 from the original packet 40 as described in connection with FIGS. 3–5) and an inner protocol data unit (PDU) 49 with a third encapsulated IP header, including a source address 49A, a destination address 49B and a payload 49C. In the preferred embodiment of the invention, the source address 49A is set to an illegal value such as x'FFFFFFFF' and the protocol type is set to 50. While the payload 49c is not defined by the current system, it may include a sequence number and a time stamp, so that the system can determine which ping is being returned and when it was originally sent so that the time period for the ping can be determined.

Figure 7:
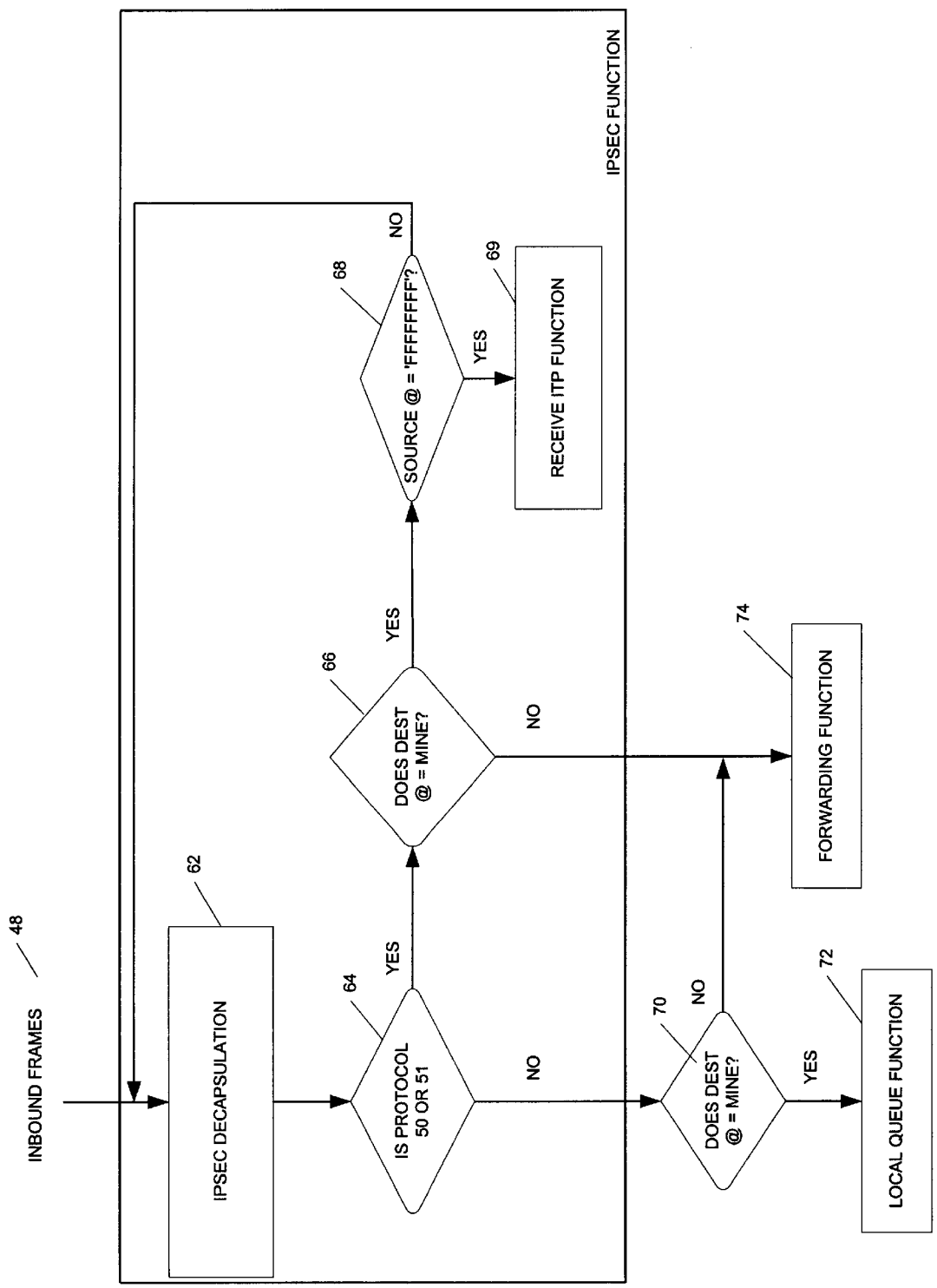
FIG. 7 illustrates processing logic for handling a returned IPSec message.

FIG. 7 illustrates the processing logic for handling a returned IPSec message 48 at the first network device 10. The inbound frame 48 flows into an IPSec function box 60 which includes an IPSec decapsulation (decryption and removal of header 48A) at logic block 62. Next, at decision block 64, the SPI (from the header 48A) is tested to see if it is a defined protocol (such as 50 or 51. If the result is "yes" at decision block 64, then at decision block 66, a test is made to determine if the destination address is the same as the address of the first network device. If yes, the process continues at decision block 68 where the source address 49A in the third encapsulated IP header is tested for the "illegal value" of x'FFFFFFFF'. If the source address 49A for the inbound frame is not the illegal value, then processing control returns to logic block 62 to handle the next inbound frame. If the source address 49A for the inbound frame is the illegal value of x'FFFFFFFF', then the "receive ITP function" is executed in logic block 69, indicating that an IPSec ping has been successfully received back from the second device, and that the second device and the intervening network, including the secure IPSec tunnels 32, 34 are functioning properly.

If the result of the test in decision block 64 is "no", indicating that the protocol type is not proper (50 or 51 for IPSec), then control proceeds to decision block 70 where the destination address is tested to see if the message is addressed to the first device 10 with its Internet Protocol (IP) address. If the answer is yes in decision block 70, then the inbound frame is put on the local queue function at logic block 72, that is, the message is something other than an IPSec message or a IPSec ping message. If either decision block 66 or decision block 70 yields a no answer, indicating that an inbound frame is not addressed to the first device 10 with its IP address, then the inbound frame is handled by a forwarding function at logic block 74 to send it to the proper network device.

Figure 8:
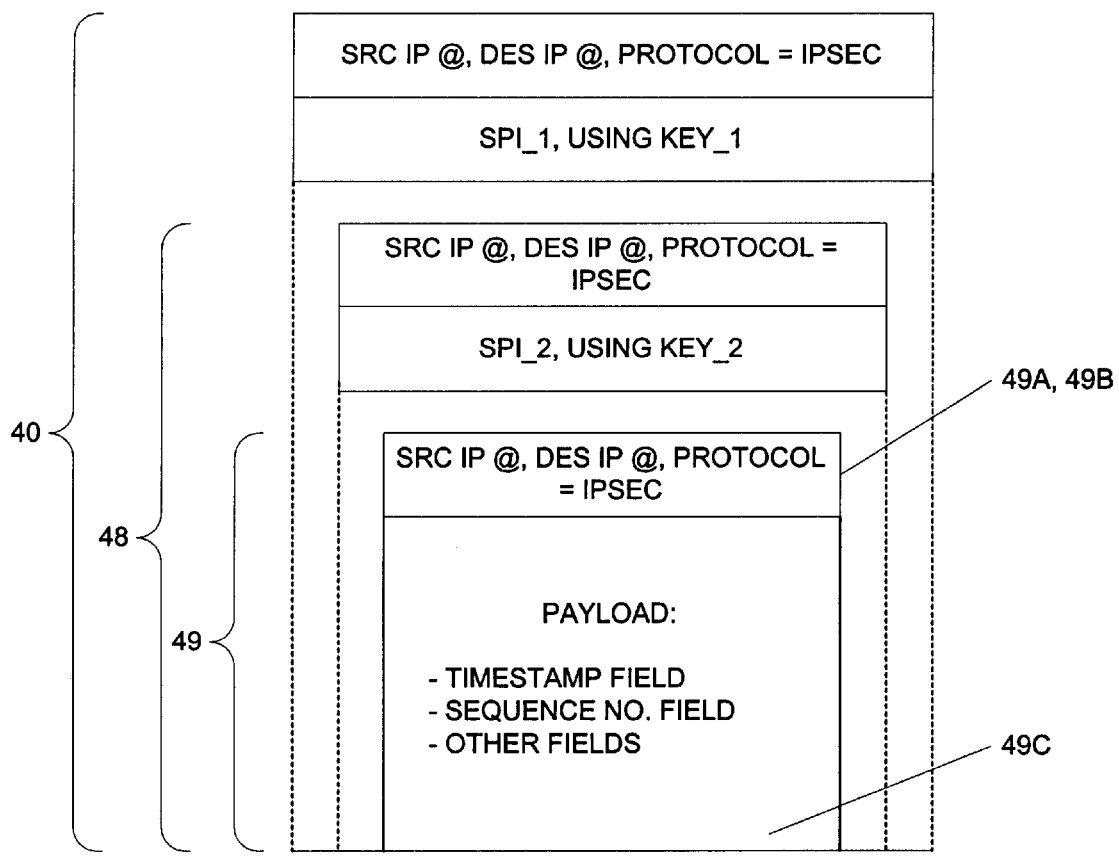
FIG. 8 illustrates a representation of the message sent from the originating network device to the destination network device to practice the present invention.

FIG. 8 illustrates the entire message 40 as originally formulated by the first device 10 to begin the process of the ping of a secure tunnel as described in connection with the present invention. The entire message 40 includes the return message 48 which, in turn, includes the innermost PDU 49 which includes the third IP header 49A, 49B and the payload 49C, as discussed above. The returned portion 48 is encrypted with the Key_2 and the SPI_2 (which would normally be used by the second device 20), and then the so-encrypted returned message 48 plus the header 42A are encrypted with the Key_1 and the SPI_1 of the first device, with all the encryption taking place at the first device 10.

Figure 9:
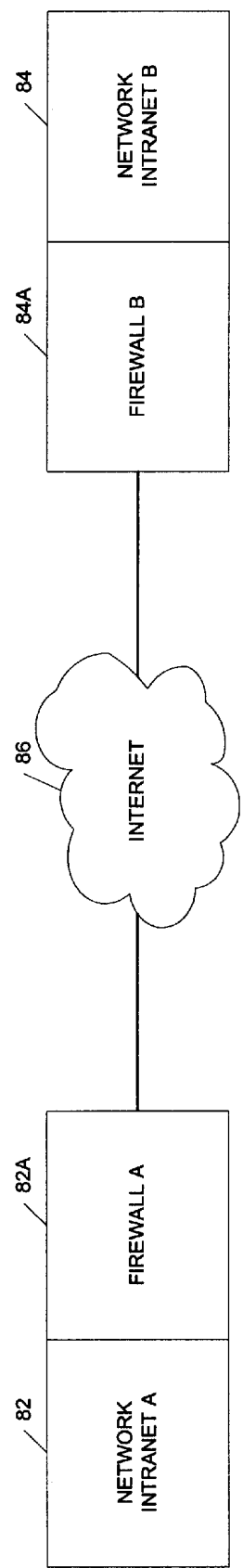
FIG. 9 illustrates an alternate embodiment of the present invention for use in an Internet and firewall environment of an alternate network.

FIG. 9 illustrates the use of the present invention in the context of an Internet system 80 with a first network 82 communicating with a second network 84 through the Internet. Associated with the first network 82 is a firewall 82A and a firewall 84A is associated with the second network 84. Each of the firewalls 82A, 84A would have associated key(s) and SPI value(s) through some key distribution system such as the Internet Key Exchange (IKE), not shown, but various methods of key distribution are well known to those involved in the art. The firewalls 82A, 84A define the secure tunnels into each network, allowing traffic (inbound messages) only from devices which are known to it and authorized by it to communicate with the respective associated networks. For the first network 82 to test the tunnels and communications between it and the second network 84, it must test the secure tunnels going both ways. That is, a message from the first network device 82 to the second network device must test the firewall 84A and the return message from the second network device 84 to the first network device 82 must test the firewall 82A on the return.

The present invention can be realized in hardware, software, or a combination of hardware and software. Any kind of computer system or other apparatus adapted for carrying out the methods described herein is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system, is able to carry out these methods.

Computer program means or computer program in the present context mean any expression, in any language, code or notation, of a set of instructions intended to cause a system having an information processing capability to perform a particular function either directly or after either or both of the following occur: a) conversion to another language, code or notation; b) reproduction in a different material form.

Those skilled in the art will appreciate that many modifications to the preferred embodiment of the present invention are possible without departing from the spirit and scope of the present invention. For example, the use of physical security pipes instead of logical security pipes could be used to advantage. Alternatively, a mode can be used where some of the communications spectrum is reserved for such secure pipes. Also, the "ping" of the present invention could be used where details of the security of the remote network device are known, since the "ping" works without regard to the type of hardware and software which are located at the remote end (the destination). In addition, it is possible to use some of the features of the present invention without the corresponding use of other features. In this regard, it is possible to use a return path which is not secure to test the one-way communications of the network, and, in that case, it may not be necessary to provide a doubly-encapsulated message with all the additional information necessary to provide for round-trip securing of Internet protocol security. Further, it may be desirable to provide for testing the two secure paths separately rather than together, separately using some features of the preferred embodiment. Accordingly, the foregoing description of the preferred embodiment is provided for the purpose of illustrating the principles of the present invention and not in limitation thereof, since the scope of the present invention is defined solely by the appended claims.

What is claimed is:

1. A system for monitoring the status of an active secure tunnel between a pair of network elements in a communications network, comprising:
   a first network element for originating and transmitting a test message to a second network element using the secure tunnel in response to the receipt of an active tunnel monitor command;
   a second network element for receiving the test message and transmitting a response back to the first network element using the secure tunnel; and
   an active tunnel monitoring logic module in the first network element for accumulating a number of times that the second network element failed to return a response to each test message during a predetermined time interval and comparing the accumulated failures with a threshold value to determine if the active secure tunnel has become disabled.

2. The system for monitoring the status of an active secure tunnel of claim 1 further comprising a computer connected to the communications network and running a network management application that transmits the active tunnel monitor command to the first network element.

3. The system for monitoring the status of an active secure tunnel of claim 1 further comprising a console interface on the first network element for generating the active tunnel monitor command.

4. The system for monitoring the status of an active secure tunnel of claim 1 further comprising two unidirectional tunnels that form the secure tunnel.

5. The system for monitoring the status of an active secure tunnel of claim 1 wherein the communications network is a virtual private network (VPN).

6. The system for monitoring the status of an active secure tunnel of claim 1 wherein the secure tunnel is an Internet Protocol Security (IPSec) tunnel.

7. The system for monitoring the status of an active secure tunnel of claim 6 wherein the test message is an IPSec tunnel ping.

8. The system for monitoring the status of an active secure tunnel of claim 1 wherein the active tunnel monitor command includes an identification of the secure tunnel to test, and an interval of time that the monitor function is active.

9. The system for monitoring the status of an active secure tunnel of claim 8 wherein the active tunnel monitor command further comprises a time to wait between each tunnel status verification attempt, a number of consecutive failures of tunnel status verification attempts required to determine that the active secure tunnel is disabled, and a payload size of a test packet.

10. The system for monitoring the status of an active secure tunnel of claim 4 wherein a first unidirectional tunnel is used to send an Internet Protocol Security (IPSec) tunnel ping from the first network element to the second network element, and a second unidirectional tunnel is used to send a response IPSec ping from the second network element to the first network element.

11. The system for monitoring the status of an active secure tunnel of claim 1 wherein the active tunnel monitoring logic prevents the transmitting of a test message if the number of bytes received or transmitted in the active secure tunnel has increased since a previous tunnel status verification attempt.

12. A method for monitoring the status of an active secure tunnel between a pair of network elements in a communications network, comprising the acts of:
   originating and transmitting a test message from a first network element to a second network element using the secure tunnel in response to an active tunnel monitor command;
   receiving the test message at a second network element and transmitting a response back to the first network element using the secure tunnel;
   accumulating a number of times that the second network element failed to return a response to each test message during a predetermined time interval; and
   comparing the accumulated failures with a threshold value to determine if the active secure tunnel has become disabled.

13. The method for monitoring the status of an active secure tunnel of claim 12 further comprising transmitting the active tunnel monitor command from a network management application to the first network element.

14. The method for monitoring the status of an active secure tunnel of claim 12 further comprising generating the active tunnel monitor command at a console interface on the first network element.

15. The method for monitoring the status of an active secure tunnel of claim 12 wherein the secure tunnel is formed from two unidirectional tunnels.

16. The method for monitoring the status of an active secure tunnel of claim 12 wherein the communications network is a virtual private network (VPN).

17. The method for monitoring the status of an active secure tunnel of claim 12 wherein the secure tunnel is an Internet Protocol Security (IPSec) tunnel.

18. The method for monitoring the status of an active secure tunnel of claim 17 wherein the test message is an IPSec tunnel ping.

19. The method for monitoring the status of an active secure tunnel of claim 12 wherein the active tunnel monitor command includes an identification of the secure tunnel to test, and an interval of time that the monitor function is active.

20. The method for monitoring the status of an active secure tunnel of claim 19 wherein the active tunnel monitor command further comprises a time to wait between each tunnel status verification attempt, a number of consecutive failures of tunnel status verification attempts required to determine that the active secure tunnel is disabled, and a payload size of a test packet.

21. The method for monitoring the status of an active secure tunnel of claim 15 wherein a first unidirectional tunnel is used to send an Internet Protocol Security (IPSec) tunnel ping from the first network element to the second network element, and a second unidirectional tunnel is used to send a response IPSec tunnel ping from the second network element to the first network element.

22. The method for monitoring the status of an active secure tunnel of claim 12 further comprising bypassing the transmitting of a test message using the secure tunnel if the number of bytes received or transmitted in the active secure tunnel has increased since a previous tunnel status verification attempt.

23. A computer readable medium containing a computer program product for monitoring the status of an active secure tunnel between a pair of network elements in a communications network, the computer program product comprising:

program instructions that originate and transmit a test message to a paired network element using the secure tunnel in response to the receipt of an active tunnel monitor command;

program instructions that receive a test message and transmit a response back to a paired network element using the secure tunnel;

program instructions that accumulate a number of times that the paired network element failed to return a response to each test message during a predetermined time interval; and program instructions that compare the accumulated failures with a threshold value to determine if the active secure tunnel has become disabled.

24. The computer program product for monitoring the status of an active secure tunnel of claim 23 further comprising program instructions that receive the active tunnel monitor command from a network management application.

25. The computer program product for monitoring the status of an active secure tunnel of claim 23 further comprising program instructions that generate the active tunnel monitor command.

26. The computer program product for monitoring the status of an active secure tunnel of claim 23 wherein two unidirectional tunnels form the secure tunnel.

27. The computer program product for monitoring the status of an active secure tunnel of claim 23 wherein the communications network is a virtual private network (VPN).

28. The computer program product for monitoring the status of an active secure tunnel of claim 23 wherein the secure tunnel is an Internet Protocol Security (IPSec) tunnel.

29. The computer program product for monitoring the status of an active secure tunnel of claim 28 wherein the test message is an IPSec tunnel ping.

30. The computer program product for monitoring the status of an active secure tunnel of claim 23 wherein the active tunnel monitor command includes an identification of the secure tunnel to test, and an interval of time that the monitor function is active.

31. The computer program product for monitoring the status of an active secure tunnel of claim 30 wherein the active tunnel monitor command further comprises a time to wait between each tunnel status verification attempt, a number of consecutive failures of tunnel status verification attempts required to determine that the active secure tunnel is disabled, and a payload size of a test packet.

32. The computer program product for monitoring the status of an active secure tunnel of claim 26 wherein a first unidirectional tunnel is used to send an Internet Protocol Security (IPSec) tunnel ping from the first network element to the second network element, and a second unidirectional tunnel is used to send a response IPSec ping from the second network element to the first network element.

33. The computer program product for monitoring the status of an active secure tunnel of claim 23 further comprising program instructions that prevent the transmitting of a test message if the number of bytes received or transmitted in the active secure tunnel has increased since a previous tunnel status verification attempt.

* * * * *